United States Patent
Qiu et al.

(10) Patent No.: US 12,149,093 B2
(45) Date of Patent: Nov. 19, 2024

(54) DEVICE COUPLING FOR WIRELESS CHARGING

(71) Applicant: Apple Inc., Cupertino, CA (US)

(72) Inventors: Weihong Qiu, San Ramon, CA (US); Jun Liu, Cupertino, CA (US); Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 271 days.

(21) Appl. No.: 16/987,691

(22) Filed: Aug. 7, 2020

(65) Prior Publication Data
US 2021/0050744 A1 Feb. 18, 2021

Related U.S. Application Data

(60) Provisional application No. 62/885,433, filed on Aug. 12, 2019.

(51) Int. Cl.
*H02J 50/10* (2016.01)
*H01F 38/14* (2006.01)
(Continued)

(52) U.S. Cl.
CPC .............. *H02J 50/10* (2016.02); *H01F 38/14* (2013.01); *H02J 7/02* (2013.01); *H02J 50/005* (2020.01)

(58) Field of Classification Search
CPC ....................................................... H02J 50/10
(Continued)

(56) References Cited

U.S. PATENT DOCUMENTS 8,169,185 B2    5/2012  Partovi et al.
8,855,354 B2 * 10/2014  He ........................... H04R 3/00
                                                       381/386
(Continued)

FOREIGN PATENT DOCUMENTS

EP       3089175       *   4/2019
KR   20170058704 A       5/2017
(Continued)

OTHER PUBLICATIONS

Application No. KR10-2020-0096914 , Office Action, Mailed on Apr. 26, 2022, 16 pages.
(Continued)

*Primary Examiner* — Edward Tso
*Assistant Examiner* — Ahmed H Omar
(74) *Attorney, Agent, or Firm* — Kilpatrick Townsend & Stockton LLP (57) ABSTRACT

Electronic apparatuses according to embodiments of the present technology may include an electronic device a first surface and a second surface opposite the first. The electronic device may include a battery and a wireless charging coil within an interior volume of the device. The electronic device may include a first magnetic conductor and positioned between the battery and the wireless charging coil. The electronic device may also include an integrated circuit coupled with the battery and the wireless charging coil. The apparatuses may include a case extending about the electronic device. The case may be characterized by a first surface and a second surface. The case may be characterized by a thickness between the first surface of the case and the second surface of the case. The case may include a second magnetic conductor incorporated within the thickness of the case at the second surface of the case.

23 Claims, 3 Drawing Sheets

(51) Int. Cl.
*H02J 7/02* (2016.01)
*H02J 50/00* (2016.01)

(58) Field of Classification Search
USPC .......................................................... 320/108
See application file for complete search history.

(56) References Cited

U.S. PATENT DOCUMENTS

| | | | | |
|---|---|---|---|---|
| 9,821,672 | B2* | 11/2017 | Chae | H01F 27/24 |
| 10,892,625 | B1* | 1/2021 | Franklin | A45C 15/00 |
| 2009/0096413 | A1* | 4/2009 | Partovi | H01F 27/2804 |
| | | | | 320/108 |
| 2010/0156345 | A1 | 6/2010 | Phelps | |
| 2012/0235636 | A1* | 9/2012 | Partovi | H04B 5/0093 |
| | | | | 320/108 |
| 2013/0127252 | A1 | 5/2013 | Yerazunis et al. | |
| 2015/0325352 | A1* | 11/2015 | Lowe | H01F 7/0247 |
| | | | | 224/191 |
| 2016/0094078 | A1 | 3/2016 | Graham et al. | |
| 2016/0294427 | A1 | 10/2016 | Wojcik | |
| 2017/0149474 | A1* | 5/2017 | Kim | H04B 5/0075 |
| 2017/0329365 | A1* | 11/2017 | Wong | A41D 1/002 |
| 2018/0109132 | A1* | 4/2018 | Cho | H02J 50/10 |
| 2020/0044482 | A1* | 2/2020 | Partovi | H02J 50/80 |
| 2022/0278554 | A1* | 9/2022 | Mishima | H02J 50/80 |

FOREIGN PATENT DOCUMENTS

| | | |
|---|---|---|
| KR | 20180042919 A | 4/2018 |
| KR | 20190083855 A | 7/2019 |
| WO | 2015/184098 A1 | 3/2015 |

OTHER PUBLICATIONS

Office Action issued in Korean Application No. KR10-2020-0096914, dated Nov. 7, 2022 in 3 pages.
Office Action issued in Germany Application No. DE102020209920.0, dated Oct. 12, 2022 in 14 pages.
First Examination Report issued in India Application No. IN202014031225, dated Feb. 27, 2023 in 5 pages.
Notice of Decision to Grant issued in Korean Application No. KR10-2020-0096914, dated Feb. 23, 2023 in 4 pages.
Chinese Patent Application No. 202010766369.9, "Office Action", May 11, 2024, 13 pages.

* cited by examiner

DEVICE COUPLING FOR WIRELESS CHARGING

CROSS-REFERENCE TO RELATED APPLICATION

The present application claims the benefit of priority to U.S. Provisional Application No. 62/885,433, filed Aug. 12, 2019, the contents of which is hereby incorporated by reference in its entirety for all purposes.

TECHNICAL FIELD

The present technology relates to wireless charging systems. More specifically, the present technology relates to wireless charging system configurations, components, and characteristics.

BACKGROUND

Wireless charging is useful for a variety of devices. As electronic devices in which wireless charging components are housed reduce in size, the available space for materials may be limited, which may affect operational performance.

SUMMARY

Electronic apparatuses according to embodiments of the present technology may include an electronic device having a display on a first surface of the electronic device. The electronic device may be characterized by a second surface opposite the first surface of the electronic device. The electronic device may include a battery, and a wireless charging coil positioned proximate the second surface of the electronic device within an interior volume defined by the electronic device. The electronic device may include a first magnetic conductor housed within the interior volume of the electronic device and positioned between the battery and the wireless charging coil. The wireless charging coil may be seated on the first magnetic conductor. The electronic device may also include an integrated circuit coupled with the battery and the wireless charging coil. The integrated circuit may be configured to receive wireless power using the wireless charging coil. The apparatuses may include a case extending about the electronic device and contacting the electronic device at a first surface of the case. The case may be characterized by a second surface of the case opposite the first surface of the case. The case may be characterized by a thickness between the first surface of the case and the second surface of the case. The case may include a second magnetic conductor incorporated within the thickness of the case at the second surface of the case.

In some embodiments, the first magnetic conductor may be or include a ferrite material or a nanocrystalline foil material. The first magnetic conductor may include a nanocrystalline foil having between about 2 and about 10 layers of a ferrosilicon-containing material. The wireless charging coil may be characterized by an annular shape including an inner annular radius defining an interior cylindrical volume. Additional layers of the ferrosilicon-containing material may be disposed within the interior cylindrical volume. The second magnetic conductor may be or include a ferrite material or a nanocrystalline foil material. The second magnetic conductor may be or include a soft ferrite material. The second magnetic conductor may be or include a cylindrical post extending for a length of more than 50% of the thickness of the case proximate the second surface of the case. The second magnetic conductor may also include an annular ring extending about the cylindrical post. An annular gap may exist between the cylindrical post and the annular ring of the second magnetic conductor. The wireless charging coil may be characterized by an annular shape characterized by a radial length from an inner annular radius of the wireless charging coil to an outer annular radius of the wireless charging coil along a radius of the wireless charging coil. The radial length of the wireless charging coil may be less than or about a radial length of the annular gap of the second magnetic conductor.

The electronic device may be or include a mobile phone or a tablet. Some embodiments of the present technology may encompass electronic apparatuses. The apparatuses may include an electronic device having a graphical display at a first exterior surface of the electronic device and a second exterior surface opposite the first exterior surface of the graphical display. The electronic device may define a volume between the first exterior surface and the second exterior surface. The apparatuses may include a first magnetic conductor housed within the volume of the electronic device and defining a recessed annular ledge disposed within the volume of the electronic device. The apparatuses may include an annular wireless charging coil housed within the volume of the electronic device and seated on the recessed annular ledge. The annular wireless charging coil may be characterized by a thickness of less than or about 100 μm. The apparatuses may include a case coupled about the electronic device and characterized by a first surface extending across and contacting the second exterior surface of the electronic device. The case may be further characterized by a second surface opposite the first surface. A thickness of the case may be defined between the first surface of the case and the second surface of the case. The apparatuses may include a second magnetic conductor integrated within the case and characterized by a thickness that is greater than 30% of the thickness of the case.

In some embodiments, the case may be or include a rubber material or plastic between the first surface of the case and the second surface of the case. The electronic device may also include a metal support plate seated proximate the second surface of the electronic device. The metal support plate may include an aperture positioned in line with the first magnetic conductor and the annular wireless charging coil. The first magnetic conductor and the second magnetic conductor may be or include a soft ferrite material or a nanocrystalline foil material. The second magnetic conductor may include a cylindrical post extending for a length of more than 50% of the thickness of the case. The second magnetic conductor may extend from the second surface of the case towards the first surface of the case. The second magnetic conductor may include a cylindrical post and an annular ring extending about the cylindrical post. An annular gap may exist between the cylindrical post and the annular ring of the second magnetic conductor. The second magnetic conductor may extend from the first surface of the case towards the second surface of the case.

Some embodiments of the present technology may encompass wireless charging systems. The systems may include a first electronic device. The first electronic device may include a case extending at least partially about the first electronic device. The first electronic device may include a battery housed within the first electronic device. The first electronic device may include a first wireless charging coil housed within the first electronic device. The first electronic device may include a first magnetic conductor housed within the first electronic device and positioned between the battery and the first wireless charging coil. The first wireless charging coil may be seated on the first magnetic conductor. The first electronic device may include a second magnetic conductor integrated within the case proximate the first wireless charging coil and axially aligned with the first magnetic conductor. The systems may include a second electronic device. The second electronic device may include a second wireless charging coil configured to operate in a wireless charging transmission mode. The second electronic device may also include at least one hard magnet within the second electronic device. In some embodiments, the first magnetic conductor and the second magnetic conductor may be or include a soft ferrite material or a nanocrystalline foil material.

Such technology may provide numerous benefits over conventional technology. For example, the present systems may produce improved charging efficiency, which may reduce charging times. Additionally, components of the present technology may reduce leakage, which may improve power reception at a device being wirelessly charged. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Wireless charging is a convenient feature for handheld products and smartphones. By incorporating charging coils in transmission and receiver devices, inductive charging can be performed. The process of wireless charging can have challenges including heat generation, regulatory requirements regarding emissions, and charging efficiency, which can all impact performance. For example, during the charging process magnetic flux is emitted from both the transmission coil and the receiver coil. In many systems, ferrite or some magnetic material is utilized to facilitate conduction of the flux to improve efficiency of distribution and collection. The ferrite provides this function by conducting the flux and directing it back towards appropriate coil(s).

Additionally, when users seat the electronic device in a case, or when the device may include an enclosure housing the wireless charging components, charging efficiencies may be reduced. For example, a case or device enclosure may increase a gap between a wireless charging coil of a charger and a wireless receiving coil incorporated within the electronic device. For many conventional systems, this reduction may be unavoidable, which may increase current leakage causing more power to be lost during charging, as well as increasing the time to charge the electronic device. The present technology overcomes many of these issues by incorporating a magnetic material into a case or device enclosure to facilitate charging and flux conduction. The material may be characterized by magnetic properties that may reduce leakage as well as the effective gap between the electronic device and the charger.

Although the remaining portions of the description will routinely reference smart phones, it will be readily understood by the skilled artisan that the technology is not so limited. The present materials and technology may be employed with any number of electronic devices that may include, without limitation, phones and mobile devices, watches, glasses, and other wearable technology including fitness devices, handheld electronic devices, laptops, tablets, and other computers, as well as other devices that may benefit from the use of wireless charging technology.

Figure 1:
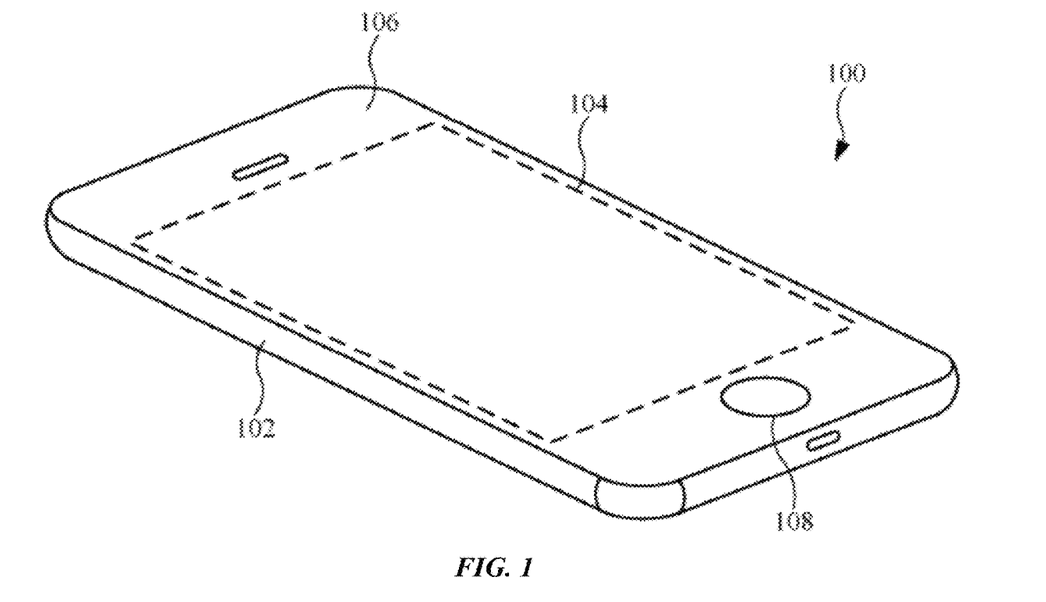
FIG. 1 shows a schematic perspective view of an electronic device according to some embodiments of the present technology.

FIG. 1 shows a schematic perspective view of an electronic device 100 according to some embodiments of the present technology. Electronic device 100 may illustrate a number of devices, which may include a mat, charging station, wireless rechargeable battery, personal computing device, or mobile device, for example. Additionally, electronic device 100 may be a tablet computing device, wearable electronic device, as well as a mobile communication device, such as a smartphone. Electronic device 100 may include an enclosure 102, or housing, that defines an internal cavity or interior volume to receive several internal components, some of which will be described below, and which may include components such as a circuit board, processor circuit, memory circuit, charging coils, and an internal power supply, as non-limiting examples. The enclosure 102 may include a metal, such as aluminum or steel, or a metal alloy that includes two or more metals. Alternatively, the enclosure 102 may include a non-metal material or materials, such as ceramics, polymers, glass, or other flexible materials including combinations of metal and non-metal materials.

The electronic device 100 may further include an active region 104 shown as a dotted line, although in some embodiments region 104 may be a coextensive portion of the enclosure 102. When present, active region 104 may include a transfer surface, or a display surface designed to present visual information in the form of still images and/or video. The active region 104 may include a capacitive touch sensitive layer designed to receive a touch input to alter the visual information. Also, the electronic device 100 may include a protective cover 106 that overlays the active region 104, when present. The protective cover 106 may include a transparent material, such as glass or sapphire, as non-limiting examples, and may include EMF shielding materials, or other materials through which electronic transfer may occur. The electronic device 100 may further include a button 108 used as a control input to a processor circuit, not shown. For example, the button 108 may depress in response to a force, and may provide a control that alters the visual information presented by the active region 104. Additionally, although not shown, the electronic device 100 may include one or more buttons disposed along the enclosure 102 to provide one or more additional control inputs.

Figure 2:
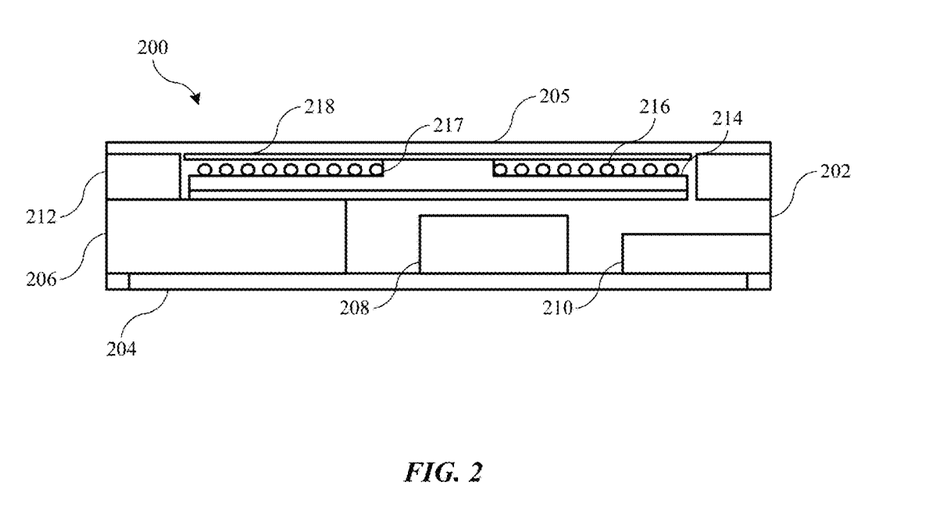
FIG. 2 shows a schematic cross-sectional view of an electronic device according to some embodiments of the present technology.

FIG. 2 shows a simplified schematic cross-sectional view of an electronic device 200 according to some embodiments of the present technology. It is to be understood that electronic device 200 is included merely to illustrate certain components according to some embodiments of the present technology, and is not intended to accurately represent either scale or position of components that may be incorporated in the device. Electronic device 200 may provide an exemplary cross-section of electronic device 100, where electronic device 100 may include a mobile computing device, or additional devices according to embodiments of the present technology. For example, electronic device 200 may include an enclosure 202 and graphical display assembly 204 as previously described, which may be included on or define a first surface of the electronic device, such as a first exterior surface. Electronic device 200 may additionally be characterized by a second surface 205, such as a second exterior surface, opposite the first surface at which display assembly 204 may be included. A volume may be defined within enclosure 202 between the first surface and the second surface. Within enclosure 202 may be a number of components as discussed above, and which may include a battery 206, a graphical processing unit 208, and an integrated circuit 210.

Battery 206 may be or include a rechargeable battery, including a number of rechargeable battery cell(s). Battery 206 may be a lithium-ion or other secondary battery type, and may be coupled with recharging circuitry and controllers operable to control charging and discharging operations. Integrated circuit 210 may be part of a circuit board, and may be a central processing unit, or other controller that may perform any number of operations within the electronic device, including operations related to wireless charging and discharging.

Additionally within enclosure 202 may be a support plate 212 that may include a number of components related to wireless charging. While previously mentioned components may be positioned between the support plate 212 and the graphical display assembly 204, certain components related to wireless charging may be positioned between or in line with the support plate and the back plate or rear of enclosure 202, including contacting or at least partially coupled with the rear of enclosure 202. These components may include a magnetic conductor 214 and a wireless charging coil 216.

First magnetic conductor 214 may be or include a ferrite material or a nanocrystalline foil. The magnetic conductor may be characterized by being non-conductive and ferrimagnetic. Exemplary ferrite materials may include any material including iron, and may include soft ferrites or materials characterized as conductors of magnetic fields. Exemplary materials may include any number of additional elements including nickel, zinc, barium, or manganese, as non-limiting examples. In some embodiments, because many mobile and other electronic devices may be characterized by reduced form factors, ferrite may not provide adequate operational characteristics, as the ferrite may become thinner to accommodate device form factor restrictions. For example, to provide sufficient space for internal components, and more space intensive materials like a battery, which may improve capacity, the ferrite may be reduced to a thickness below a millimeter, or below half a millimeter, or reduced even more. As this reduction occurs, the ability of the ferrite to steer flux continues to degrade, until the ferrite saturates. At this point, it may no longer provide benefits of redirecting fields effectively, and the charging efficiency may continue to degrade. As efficiency drops, the time to charge increases, which may generate even more heat in the device.

In many newer devices, an additional issue may be when charging operations occur with devices that may include one or more hard magnets. These hard magnets may be incorporated with drives or other internal components, and may also be included in other aspects, such as for coupling as will be described below. Regardless, hard magnets emit their own flux, which when in close vicinity to the first magnetic conductor, will also be absorbed. This further adds to the flux absorbed by the ferrite, which can quickly reach saturation for the material. Accordingly, in space restrictive devices or any electronic device according to embodiments of the present technology, especially those that may include a hard magnet, ferrite may be removed from the system as a magnetic component, and the devices may use a nanocrystalline foil, which may be or include ferrosilicon-containing material or other magnetic material in a layered or fractured material, and which may include adhesives or other polymer supports within the foil material. The foil may include any number of layers of ferrosilicon-containing material from a single layer, to two layers or more, greater than or about 4 layers, greater than or about 5 layers, greater than or about 6 layers, greater than or about 10 layers, or more. Any other magnetic conducting materials may similarly be incorporated with some embodiments of the present technology.

Incorporated with the first magnetic conductor 214 may be a wireless charging coil 216. When in a receiving operation, wireless charging coil 216 may receive power from a generated electromagnetic field from a transmitting device, and this received power may be converted into current that may charge a rechargeable battery of the electronic device, such as battery 206. Integrated circuit 210 may be configured to operate the wireless charging coil in a wireless charging receiving mode, such as to provide charging to the battery. In some embodiments, the integrated circuit may also be configured to operate the wireless charging coil in a wireless charging transmission mode. The integrated circuit 210 may operate the coil in either mode by any number of control mechanisms.

The wireless charging coil may be a single wire formed in a coil characterized by an annular shape as shown in cross-section in the figure. The annulus may include an inner annular radius 217, which may be defined from a central axis through the device, and which may define an interior volume or gap through the wireless charging coil. The gap may be characterized by any different geometry depending on the coil distribution, and may be characterized by a cylindrical volume as illustrated. The first magnetic conductor, or a portion of the first magnetic conductor, may extend through the cylindrical volume. An e-shield 218 may be positioned between the wireless charging coil 216 and the back wall of enclosure 202, and may extend laterally across the wireless charging coil 216 as well as the first magnetic conductor extending through the wireless charging coil. The first magnetic conductor may include multiple layers where a first layer defines a surface on which the wireless charging coil may be seated, and a second layer is positioned within the wireless charging coil centrally defined volume. Each of these layers may also include one or more layers of material. Additionally, the first magnetic conductor may be a single component shaped to the geometry illustrated or any other geometry. The first magnetic conductor may form a recessed ledge on which the wireless charging coil may be seated, and which may be a recessed annular ledge formed to accommodate the coil distribution.

The wireless charging coil may be formed of any number of metals or alloys that may be conductive, and may be characterized by a thickness of less than or about 250 µm in some embodiments, which may limit the use of space within device 200. Additionally, in some embodiments the wireless charging coil may be characterized by a thickness of less than or about 200 µm, less than or about 150 µm, less than or about 100 µm, less than or about 50 µm, or less. The thickness of the coil may be one of several competing factors that may be used to accommodate the form factor of electronic device 200. For example, increasing the thickness of coil 216 may then increase the thickness of the associated magnetic material, which may reduce space available for a battery. Additionally, reducing the thickness of the coil may provide more space within the housing, but may increase the resistance of the coil, which may increase heating during charging operations. Accordingly, in some embodiments the wireless charging coil may be characterized by a thickness greater than or about 20 µm, greater than or about 30 µm, greater than or about 40 µm, greater than or about 50 µm, greater than or about 60 µm, greater than or about 70 µm, or more. Another advantage of utilizing a nanocrystalline foil according to some embodiments of the present technology is that the foil may be characterized by a reduced thickness relative to ferrite, which may allow an increased coil thickness, while maintaining a similar or reduced overall form factor.

Figure 3:
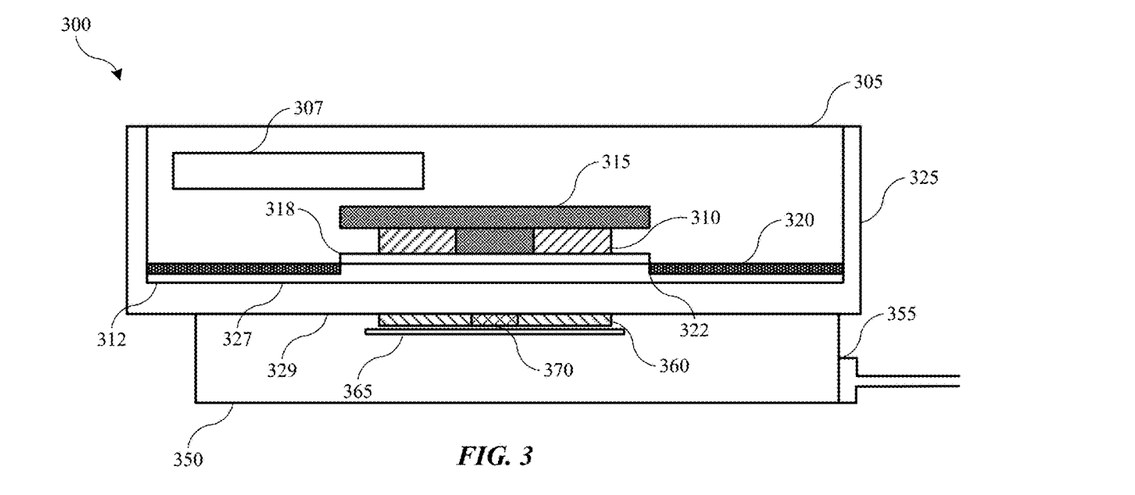
FIG. 3 shows a schematic cross-sectional view of a charging system according to some embodiments of the present technology.

FIG. 3 shows a schematic cross-sectional view of a charging system 300 according to some embodiments of the present technology. The charging system is illustrated with an electronic device, which may include any component or aspect of electronic device 200 discussed above, although FIG. 3 is illustrated with only some components, such as certain components related to wireless charging. It is to be understood, however, that the description may similarly relate to or include any other device discussed throughout the present disclosure. As illustrated, system 300 may include a first electronic device 305 shown in a simplified form, but which may be similar to any of the electronic devices previously described, including a phone, tablet, or other device, and may include any of the components of electronic devices 100 or 200, including being electronic devices 100 or 200, and may include any of the material characteristics previously described. As previously discussed, first electronic device 305 may include a battery 307 and an integrated circuit as noted in electronic device 200. The integrated circuit may be configured to operate the first wireless charging coil in a receiving mode or transmission mode in embodiments.

First electronic device 305 may include a wireless charging coil 310, which may be positioned near or proximate a second surface 312 of the electronic device, such as opposite a display as noted previously. Second surface 312 may be any material forming the electronic device, such as glass, plastic, metal, or any other materials that may be used in an enclosure of an electronic device as discussed above. The wireless charging coil 310 may be disposed within an interior volume of the first electronic device. A first magnetic conductor 315 may be housed within the interior volume as well, and may be positioned between the battery 307 and the wireless charging coil. An optional e-shield 318 may additionally be included in some embodiments.

As illustrated, the first magnetic conductor 315 may define a recessed annular ledge about the conductor in some embodiments, and with or without the ledge, wireless charging coil 310 may be seated on the first magnetic conductor 315. In some embodiments an e-shield may be positioned within the interior volume of the first electronic device between the wireless charging coil and the second surface of the first electronic device. A support plate 320 may be seated against or proximate an internal surface of the second surface of the first electronic device. Support plate 320 may be metal or any other material, and may provide additional stability and strength for the device. In some embodiments where support plate 320 is metal, an aperture 322 or access may be defined through the support plate. The aperture 322 may be sized and positioned in line with the first magnetic conductor 315 and the wireless charging coil 310, to ensure wireless power may be received or transmitted through the device.

Additionally illustrated is an electronic device case 325, which may at least partially extend about the electronic device 305 to provide an electronic apparatus. Although the remaining materials will reference device cases, it is to be understood that the present technology may similarly apply to thicker electronic devices, such as for which the identified material 325 may also encompass an enclosure of device 305, which may not be a separable case, and may be actual device enclosure components. Many users of electronic devices use cases to provide additional support and protection for the electronic device, as well as functionality, such as charging, built-in stands, foldable covers providing additional storage, and other common aspects of device cases. Case 325 may provide apertures through the structure, such as for camera lenses, lights, buttons, switches, connection ports, speakers, microphones, and other aspects of the device. However, case 325 may generally extend across second surface 312 of the first electronic device 305, and may further extend along side surfaces, and may or may not extend across a top face, first surface, or display of the electronic device. Case 325 may be or include a single component, or multiple separate and joinable components in embodiments. Case 325 may include a first surface 327 contacting the second surface 312 of the electronic device. Case 325 may additionally include a second surface 329 of the case, which may be opposite the first surface 327. Case 325 may be characterized by a thickness between the first surface 327 and the second surface 329 of the case. The thickness may be consistent or inconsistent across the case. Case 325 may be made of any number of materials that may be or include plastic, metal, rubber, glass, polymeric materials, or any other materials that may be used to produce electronic device cases.

Charging system 300 may also include a second electronic device 350, which may be a wireless charger in some embodiments. Wireless chargers compatible with the present technology may include any number of devices, including any device noted above in FIG. 1 and FIG. 2. Although the wireless chargers may or may not include wired power coupling, second electronic device 350 may optionally include a wired connection 355 for access to mains power. Second electronic device 350 may include any number of components, but of note may include a second wireless charging coil 360, which may include any of the features, materials, or characteristics of wireless charging coils described previously. Second electronic device 350 may include a ferrite, foil, or other magnetic conductor 365. Additionally, second electronic device 350 may include one or more hard magnets 370, which may allow coupling with a first electronic device to facilitate wireless charging and coil alignment. As explained above, hard magnets in these electronic devices may cause additional magnetic flux, which may be absorbed by the magnetic conductors, although the additional magnetic flux may impact efficiency of charging and saturation of the materials. In some embodiments, nanocrystalline foils may afford increased saturation relative to some ferrite materials, which may maintain charging operations at higher efficiency.

Wireless charging efficiency may be impacted by a number of factors including materials used, power levels, as well as a distance or gap between the wireless charging coils of the transmitting and receiving devices. Even small increases in gap distance may impact the efficiency of charging, which may be directly related to a coupling coefficient that is affected by gap distance. For example, when a first electronic device to be charged is placed directly on a second electronic device transmitting wireless power, the gap may be minimal between the two components, and may be affected only by enclosure materials covering the coils of the two devices. However, when an electronic device is seated within a case, such as case 325, the gap between the coils may increase. For example, for an exemplary first and second electronic device, direct coupling may produce a coupling coefficient of about 0.9, which accounts for the exterior housing of the two devices. When a case is inserted to increase the gap by even 2 mm, or a thicker device enclosure is used, the coupling coefficient may drop to 0.7 or lower. If the case or enclosure increases the gap to 4 mm, the coupling coefficient may further reduce to 0.5 or lower, which may be dependent on the devices, materials of the case, and other environmental factors. Regardless, this reduction may dramatically increase the leakage of magnetic flux, which reduces charging efficiency. This may both produce higher power loss or waste, and may increase the time to charge the first electronic device.

Figure 4:
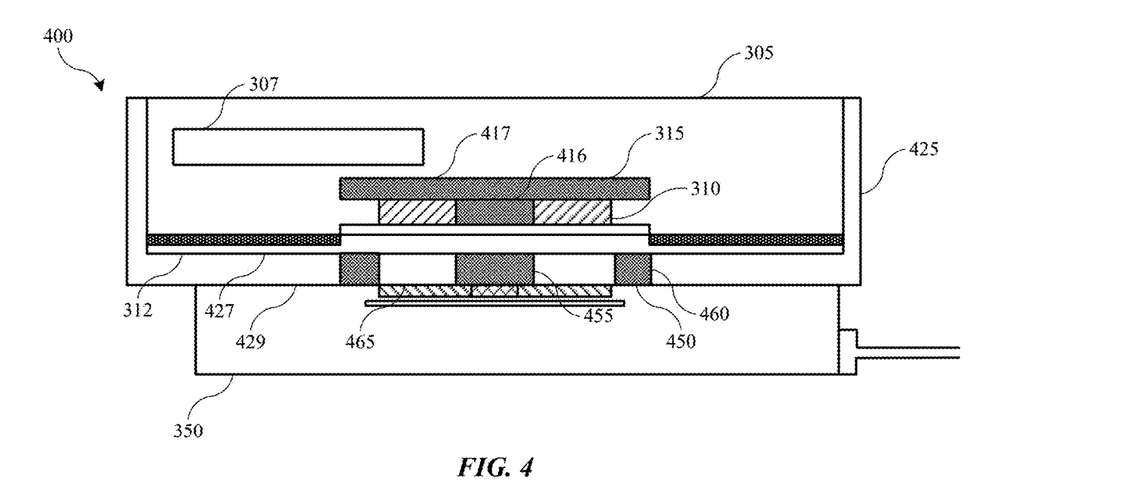
FIG. 4 shows a schematic cross-sectional view of a charging system according to some embodiments of the present technology.

The present technology may recover a portion if not a majority of these losses by incorporating a second magnetic conductor within the case material. FIG. 4 shows a schematic cross-sectional view of a charging system 400 according to some embodiments of the present technology. Charging system 400 may include similar components as charging system 300, but may incorporate a different case for the electronic device. Charging system 400 may include a first electronic device 305 and a second electronic device 350, which may include any of the components, materials, or characteristics of any device discussed previously. However, in some embodiments, first electronic device 305 may be seated within a case 425, which may also be illustrative of an adapted enclosure that extends a similar amount about the internal components. Case 425, or an integrated enclosure, may have any of the components, characteristics, or materials of case 325 or any other case discussed above, including a device enclosure of similar proportions. For example, case 425 may extend about electronic device 305, and contact second surface 312 of first electronic device 305 along a first surface 427 of case 425. Case 425 may also be characterized by a second surface 429 opposite first surface 427. A thickness of the case 425 may be defined between the first surface 427 and the second surface 429 of the case as described above.

Case 425 may also include a second magnetic conductor 450 incorporated or integrated within the case 425 along or through a thickness of the case. Second magnetic conductor 450 may coordinate with first magnetic conductor 315 of electronic device 305 to facilitate wireless power delivery and improve efficiency of charging of the electronic device. Second magnetic conductor 450 may be the same material or a different material from first magnetic conductor 450, and may be or include any of the materials described previously, including ferrite materials, such as soft ferrite materials, nanocrystalline foil materials, or other magnetic conductor materials.

The second magnetic conductor may include one or more features to accommodate aspects of the wireless charging coil 310 and first magnetic conductor 315. For example, as discussed above, wireless charging coil 310 may be characterized by an annular shape, which may be further characterized as having a radial length from an inner annular radius of the wireless charging coil to an outer annular radius of the wireless charging coil along a radius of the charging coil extending from a central axis through the wireless charging coil. First magnetic conductor 315 may include one or more components including a central post 416 extending through the wireless charging coil and a sheet 417 extending along a surface of the wireless charging coil as illustrated. Second magnetic conductor 450 may include one or more components that accommodate this structure. For example, second magnetic conductor may include a geometrically shaped post, such as a cylindrical post 455, extending at least partially within and through the case 425, and which may be axially aligned with central post 416 of the first magnetic conductor. Second magnetic conductor may also include an annular ring 460 extending about the cylindrical post 455, and which may be axially aligned with the sheet 417, wireless charging coil 310, or other feature of the wireless charging components of the electronic device 305. It is also to be understood that electronic device 305 need not include complementary magnetic structures adjacent to magnetic conductor 450.

An annular gap 465 may exist between the cylindrical post 455 and the annular ring 460 as illustrated. In some embodiments, the radial length of the wireless charging coil may be less than or about a radial length of the annular gap 465 of the second magnetic conductor, which may maintain the charging coil exposed to the transmitting or receiving charging coil of an associated second electronic device. Second magnetic conductor 450 may be characterized by a number of varying components and configurations, and is not intended to be limited by the example illustrated in FIG. 4. For example, second magnetic conductors according to embodiments of the present technology may include either of the noted components as well as variations on the locations and thicknesses of the materials.

Figure 5A:
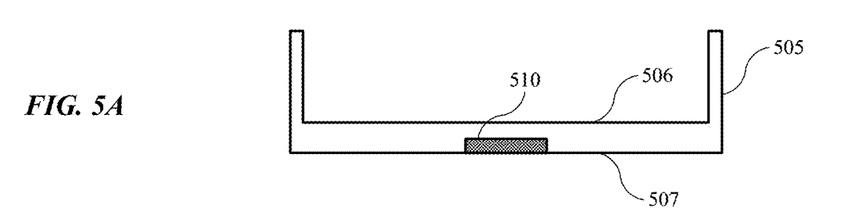
FIGS. 5A-5C show exemplary component configurations according to some embodiments of the present technology.
Figure 5B:
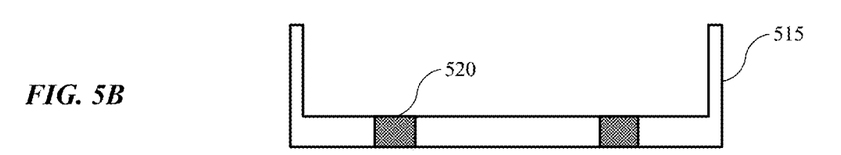
Figure 5C:
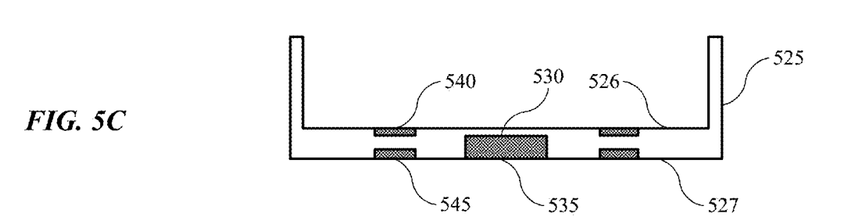

FIGS. 5A-5C show exemplary component configurations according to some embodiments of the present technology. For example, FIGS. 5A-5C show a few illustrative possibilities for second magnetic conductor configurations. It is to be understood that the figures are not intended to be limiting, but are included to describe some of the adjustments that may be performed or applied to cases according to embodiments of the present technology. Cases illustrated in FIGS. 5A-5C may include any of the materials, components, or characteristics described elsewhere.

FIG. 5A illustrates an example incorporation of a second magnetic conductor 510 where only a central post is utilized. Additionally, the central post is included through only a partial thickness of the case 505 from a second surface 507 towards a first surface 506. In another embodiment the central post may extend partially through the case from first surface 506 towards second surface 507. The amount of extension within or through the thickness of the case may be beneficial to charging efficiency regardless of the amount of inclusion by reducing an effective gap between the two charging coils of a wireless charging system. The second magnetic conductor may further direct or channel magnetic flux towards the receiving coil by extending the magnetic field through the conductive material of the second magnetic conductor.

Accordingly, while incorporating magnetic conductor material fully through the case may produce the most improvement, any incorporation may improve the coupling coefficient by reducing an effective gap distance between the coils. Hence, in embodiments of the present technology, any component of the second magnetic conductor may extend at least about 10% of a distance or thickness through or within a case, and any component may extend greater than or about 20% of the distance or thickness through the case, greater than or about 30%, greater than or about 40%, greater than or about 50%, greater than or about 60%, greater than or about 70%, greater than or about 80%, greater than or about 90%, greater than or about 95%, greater than or about 98%, or more, although in some embodiments the second magnetic conductor may be fully integrated or incorporated within the case or enclosure, and may not extend through a top or bottom surface of the case.

FIG. 5B illustrates another exemplary embodiment where second magnetic conductor 520 includes only an annular ring extending through the case 515. In some embodiments, annular ring 520 may or may not be a complete ring as well. For example, a series of posts may be incorporated in an arcuate pattern about the case, or semicircular sections of second magnetic conductor material may be included. Additionally, the annular ring may extend any amount within the case as noted above. FIG. 5C illustrates yet another example of a second magnetic conductor 530 incorporated within case 525. As illustrated, second magnetic conductor 530 includes several of the variations noted above, and also shows an additional variation where multiple of the components of the conductor may be included. For example, along with central post 535 extending partially through the case material, a first annular ring 540 may be included proximate a first surface 526 of case 525, and a second annular ring 545 may be included proximate a second surface 527 of case 525. Each of the annular rings may extend any distance through the case, and may also be laterally offset from one another, although the rings may be concentric about central post 535. Accordingly, any number of variations for incorporating a second magnetic conductor in a case may be performed and are similarly encompassed by the present technology.

Figure 6A:
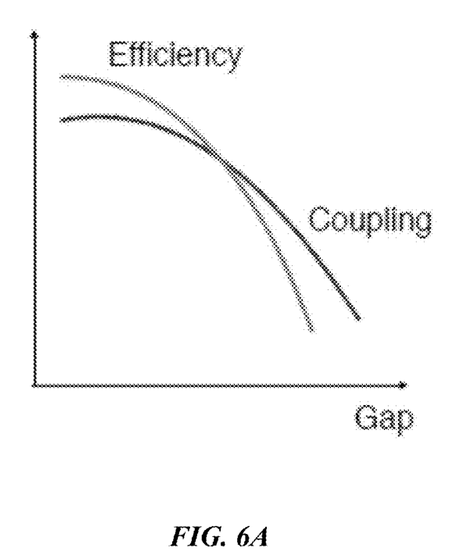
FIGS. 6A-6B show coupling and efficiency plots relative to gap size in systems according to some embodiments of the present technology.
Figure 6B:
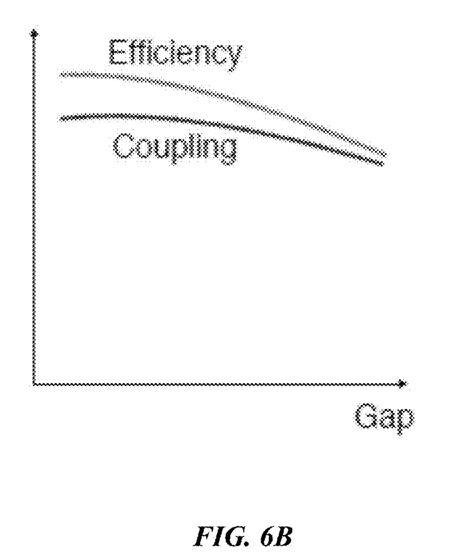

FIGS. 6A-6B show coupling and efficiency plots relative to gap size in systems according to some embodiments of the present technology. For example, FIG. 6A illustrates an effect on coupling between wireless charging coils, and the efficiency of charging, as a gap between a transmitting and a receiving coil is increased with a case or thicker enclosure as explained previously, such as with FIG. 3, for example. As the case thickness increases, the gap between the coils increases, and coupling between the coils reduces exponentially. This creates an exponential reduction in charging efficiency, which may increase power losses and increase charging time. FIG. 6B illustrates an effect on coupling for the same system, but with a case or enclosure according to embodiments according to the present technology including a second magnetic conductor material incorporated in the case.

As illustrated, a similar gap length increase only marginally reduces coupling between the coils as well as charging efficiency. Consequently, cases or device enclosures incorporating second magnetic conductor materials according to embodiments of the present technology may maintain up to or greater than about 75% efficiency and/or coupling despite an increase in gap length relative to directly coupled devices, and may maintain greater than or about 80% efficiency and/or coupling, greater than or about 85% efficiency and/or coupling, greater than or about 90% efficiency and/or coupling, greater than or about 95% efficiency and/or coupling, greater than or about 98% efficiency and/or coupling, or more. By using second magnetic conductors according to embodiments of the present technology, either within electronic devices having thicker enclosures, or in cases in which electronic devices may be seated, efficiency and coupling may be at least partially maintained to limit power losses and increases in charging time.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the layer" includes reference to one or more layers and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. An electronic apparatus comprising:
   an electronic device comprising a display on a first surface of the electronic device and a second surface opposite the first surface of the electronic device, the electronic device including:
   a battery,
   a wireless charging coil positioned proximate the second surface of the electronic device within an interior volume defined by the electronic device,
   a first magnetic conductor housed within the interior volume of the electronic device and positioned between the battery and the wireless charging coil, wherein the wireless charging coil is seated on the first magnetic conductor, and
   an integrated circuit coupled with the battery and the wireless charging coil, the integrated circuit configured to receive wireless power using the wireless charging coil; and
   a case extending about the electronic device and contacting the electronic device at a first surface of the case, wherein the case includes a second surface of the case opposite the first surface of the case, and wherein the case has a thickness defined between the first surface of the case and the second surface of the case, the case including:
   a second magnetic conductor incorporated within the thickness of the case and defining an aperture that is at least partially aligned with the wireless charging coil and is arranged to direct magnetic flux received from a wireless power transmit coil to the wireless charging coil to improve coupling between the wireless power transmit coil and the wireless charging coil.

2. The electronic apparatus of claim 1, wherein the first magnetic conductor comprises a ferrite material or a nanocrystalline foil material.

3. The electronic apparatus of claim 2, wherein the first magnetic conductor comprises a nanocrystalline foil having between about 2 and about 10 layers of a ferrosilicon-containing material.

4. The electronic apparatus of claim 3, wherein the wireless charging coil includes an annular shape comprising an inner annular radius defining an interior cylindrical volume.

5. The electronic apparatus of claim 4, wherein additional layers of the ferrosilicon-containing material are disposed within the interior cylindrical volume.

6. The electronic apparatus of claim 1, wherein the second magnetic conductor comprises a ferrite material or a nanocrystalline foil material.

7. The electronic apparatus of claim 6, wherein the second magnetic conductor comprises a soft ferrite material.

8. The electronic apparatus of claim 6, wherein the second magnetic conductor comprises a cylindrical post extending for a length of more than 50% of the thickness of the case proximate the second surface of the case.

9. The electronic apparatus of claim 8, wherein the second magnetic conductor further comprises an annular ring extending about the cylindrical post, and wherein an annular gap exists between the cylindrical post and the annular ring of the second magnetic conductor.

10. The electronic apparatus of claim 9, wherein the wireless charging coil includes an annular shape having a radial length from an inner annular radius of the wireless charging coil to an outer annular radius of the wireless charging coil along a radius of the wireless charging coil.

11. The electronic apparatus of claim 10, wherein the radial length of the wireless charging coil is less than or about a radial length of the annular gap of the second magnetic conductor.

12. The electronic apparatus of claim 1, wherein the electronic device comprises a mobile phone or a tablet.

13. An electronic apparatus comprising:
    an electronic device having a graphical display at a first exterior surface of the electronic device and a second exterior surface opposite the first exterior surface of the graphical display, wherein the electronic device defines a volume between the first exterior surface and the second exterior surface;
    a first magnetic conductor positioned within the volume of the electronic device and defining a recessed annular ledge disposed within the volume of the electronic device;
    an annular wireless charging coil positioned within the volume of the electronic device and seated on the recessed annular ledge;
    a case coupled to the electronic device and including a first surface extending across and contacting the second exterior surface of the electronic device, wherein the case further includes a second surface opposite the first surface, and wherein a thickness of the case is defined between the first surface of the case and the second surface of the case; and
    a second magnetic conductor integrated within the case and defining an aperture that is at least partially aligned with the annular wireless charging coil and is arranged to direct magnetic flux received from a wireless power transmit coil to the annular wireless charging coil to improve coupling between the wireless power transmit coil and the annular wireless charging coil.

14. The electronic apparatus of claim 13, wherein the case comprises a rubber material or plastic between the first surface of the case and the second surface of the case.

15. The electronic apparatus of claim 13, wherein the electronic device further comprises a metal support plate seated proximate the second surface of the electronic device, wherein the metal support plate comprises an aperture positioned in line with the first magnetic conductor and the annular wireless charging coil.

16. The electronic apparatus of claim 13, wherein the first magnetic conductor and the second magnetic conductor comprise a soft ferrite material or a nanocrystalline foil material.

17. The electronic apparatus of claim 13, wherein the second magnetic conductor comprises a cylindrical post extending for a length of more than 50% of the thickness of the case, and wherein the second magnetic conductor extends from the second surface of the case towards the first surface of the case.

18. The electronic apparatus of claim 13, wherein the second magnetic conductor comprises a cylindrical post and an annular ring extending about the cylindrical post, wherein an annular gap exists between the cylindrical post and the annular ring of the second magnetic conductor, and wherein the second magnetic conductor extends from the first surface of the case towards the second surface of the case.

19. A wireless charging system comprising:
a first electronic device comprising:
a case extending at least partially about the first electronic device,
a battery housed within the first electronic device,
a first wireless charging coil housed within the first electronic device,
a first magnetic conductor housed within the first electronic device and positioned between the battery and the first wireless charging coil, wherein the first wireless charging coil is seated on the first magnetic conductor, and
a second magnetic conductor integrated within the case proximate the first wireless charging coil and defining an aperture that is axially aligned with the first magnetic conductor; and
a second electronic device comprising:
a second wireless charging coil configured to operate in a wireless charging transmission mode, and
at least one hard magnet within the second electronic device,
wherein the second magnetic conductor is arranged to direct magnetic flux received from the second wireless charging coil to the first wireless charging coil to improve coupling between second wireless charging coil and the first wireless charging coil.

20. The wireless charging system of claim 19, wherein the first magnetic conductor and the second magnetic conductor comprise a soft ferrite material or a nanocrystalline foil material.

21. The electronic apparatus of claim 1 wherein the second magnetic conductor comprises an annular ring having an inner diameter, and the inner diameter is at least partially aligned with the wireless charging coil.

22. The electronic apparatus of claim 1 wherein the first magnetic conductor has a diameter greater than a diameter of the wireless charging coil such that the first magnetic conductor overhangs the wireless charging coil.

23. The electronic apparatus of claim 1 wherein the second magnetic conductor comprises an annular ring having an inner diameter, the inner diameter is at least partially aligned with the wireless charging coil, and the first magnetic conductor overhangs the wireless charging coil to align with the annular ring of the second magnetic conductor.

\* \* \* \* \*